Patented Feb. 3, 1953

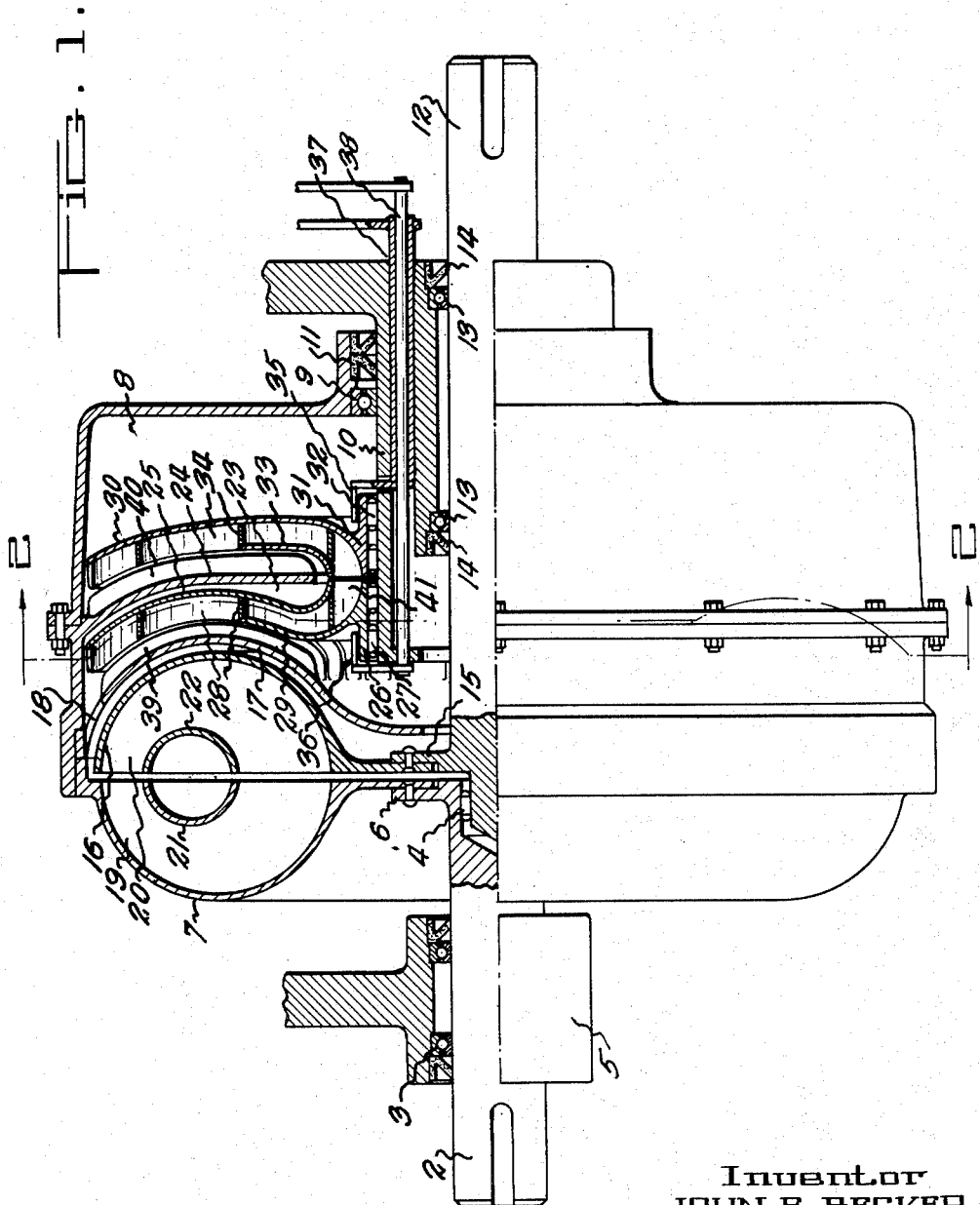

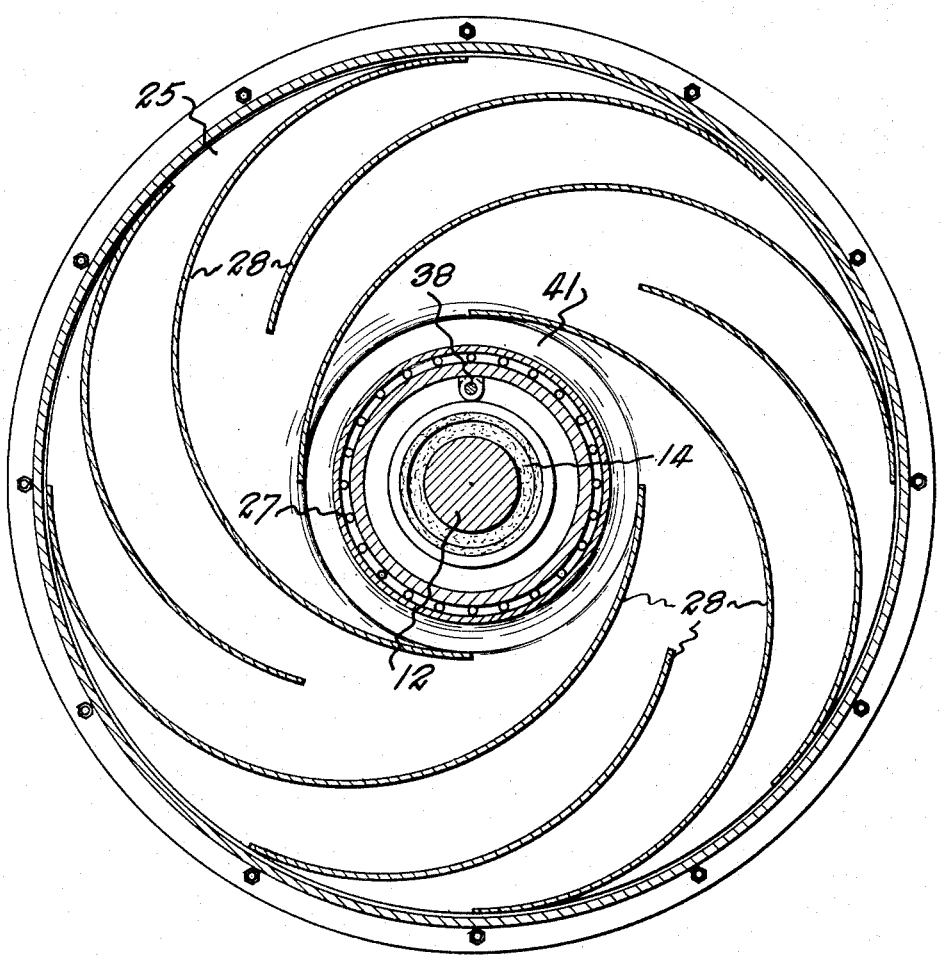

2,627,166

UNITED STATES PATENT OFFICE 2,627,166

ROTARY FLUID COUPLING

John Edward Becker, Darlington Township, Durham County, Ontario, Canada, assignor to Atlas Polar Company Limited, Toronto, Ontario, Canada, a corporation of Canada Application February 1, 1950, Serial No. 141,709

7 Claims. (Cl. 60—54)

This invention relates to improvements in fluid couplings and the purpose of the invention is to furnish improved means for transferring fluid from the coupling to a rotating reservoir, and from the reservoir to the coupling, such transfer means in part comprising a pair of rotatable members each containing a plurality of spaced-apart blades extending from the central portions of the members to their peripheries, the blades constituting fluid scoops and being oppositely directed to the direction of rotation of the coupling and the reservoir.

I am aware that the foregoing type of fluid scoop transfer means has been disclosed, as for example in the constructions shown in United States Patent Number 1,859,607, May 24, 1932; and the particular object of this invention is to provide an improved coupling construction of much greater efficiency than the constructions designed heretofore, and wherein one of the transfer members is contained within a fluid chamber incorporated within the impeller housing to rotate therewith, such chamber being divided from the runner housing by a wall having a plurality of orifices in its peripheral portion through which fluid may enter and leave the coupling.

A further object of the invention is to so form the fluid chamber wall that it substantially follows the contour of the runner housing and to also so form the transfer member within the housing that its contour follows the contour of the chamber wall.

Another and very important feature of the invention is to furnish a plurality of radially arranged fins which are contained upon the inner faces of the fluid chamber and fluid reservoir in proximity of the edges of the blades of the transfer members, whereby the passage of fluid from the central to the peripheral portions of the coupling assembly is greatly accelerated under the guidance of the vanes.

With the foregoing and other objects in view as shall hereinafter appear, my invention consists of a fluid coupling constructed and arranged all as hereinafter more particularly described and illustrated in the accompanying drawings in which:

Fig. 1 is a side elevational view of the coupling and reservoir assembly, the upper half thereof being shown in section, and Fig. 2 is a cross-sectional view taken through the line 2—2, Fig. 1.

Like characters of reference indicate corresponding parts in the different views of the drawings.

The driving shaft 2 is supported by ball and roller races 3 and 4, the former being carried within a suitable supporting bracket 5. The inner end of the driving shaft 2 is formed with a flange 6, and an impeller housing 7 of orbicular form and of substantially 8-shaped cross-section is secured to the face of the flange 6 to rotate with the driving shaft 2. The impeller housing 7 has a fluid reservoir 8 attached thereto and carried by a ball bearing 9 mounted upon a stationary sleeve 10, a fluid seal ring 11 being positioned adjacent to the bearing 9. The sleeve 10 contains a driven shaft 12 mounted within ball bearings 13, fluid seal rings 14 being also provided. The inner end of the driven shaft 12 is journalled within a bore in the adjacent end of shaft 2 by bearing means 4 and carries a flange 15, and a concave ring-shaped runner housing 16 is secured to the flange and contained within the impeller housing 7.

The impeller housing 7 contains a partition wall 17 which is shaped to follow the contour of the runner housing 16. The outer edge of the partition wall 17 is secured to the inner face of the peripheral wall of the housing 7 and the wall is formed at its center with an orifice of greater diameter than the driven shaft 12. The outer portion of the partition wall is pierced by a plurality of orifices 18 arranged around the peripheral portion of the wall and through which fluid passes in entering and leaving the impeller containing portion of the housing 7.

The impeller housing 7 and the runner housing 16 contains a plurality of the usual radial impeller vanes 19 and 20, supporting the usual ring members 21 and 22, so that passages are formed for the fluid transmission of power in the standard fashion. The fluid chamber 23 is divided from the fluid reservoir 8 by a wall 24, the outer peripheral portion of which is shaped to follow the contour of the wall 17. The central portion of the wall 24 is formed with an orifice of greater diameter than the diameter of the sleeve 10, which it surrounds, whereby a ring-shaped opening is constituted and within which the hub portions of the transfer members are contained, as shall be hereinafter explained.

The transfer member contained within the fluid chamber 23 comprises a disc 25 dished to follow the contour of the wall 17 and which is mounted upon a hub 26 carried upon a ball race 27 which surrounds the sleeve 10. The disc 25 carries a plurality of curved fluid scoop blades 28 extending from its central portion to its outer edge, as shown in Fig. 2. The hub 26 also carries a small diameter disc 29 which is spaced away from the disc 25 and forms a support for the inner ends of the blades 28.

The fluid reservoir 8 contains a fluid transfer member of substantially the same construction as the fluid transfer member in the fluid chamber 23. This member comprises a disc 30 having a hub 31 carried upon a roller bearing 32 mounted upon the sleeve 10, and also a disc 33 of smaller diameter than the disc 30 and spaced away therefrom. The disc 30 carries a plurality of curved fluid scoop blades 34 which are arranged in the same fashion as the scoop blades 28.

The hubs 26 and 31 are surrounded by brake bands 36 and 35, respectively. The brake band 35 is actuated by a manually turnable sleeve 37 which extends through a longitudinal bore in the wall of the sleeve 10, and the brake band 36 is actuated by a manually turnable rod 38 freely journalled within the sleeve 37.

The inner face of the wall 17 of the fluid chamber 23 carries a plurality of radially arranged fins 39 having their outside edges in close proximity to the blades 28, and the inner face of the wall 25 also carries a plurality of radially arranged fins 40 having their outer side edges in close proximity to the side edges of the blades 34.

Operation

When the impeller housing 7 contains fluid and full power is being transmitted from the driving shaft 2 to the driven shaft 12, the transfer members in the fluid chamber and the fluid reservoir freely rotate with the coupling at substantially the same speed as the speed of rotation of the centrifugal fluid ring within the coupling.

If it is desired to reduce the speed of the driven shaft 12 or to completely empty the coupling to bring the driven shaft 12 to a stop, the brake 36 is applied through rotation of the rod 38 to reduce the speed of, or stop rotation of the transfer member in the fluid chamber 23. As the blades 28 are oppositely directed to the direction of rotation of the coupling and its centrifugal fluid ring within the fluid chamber 23, the retarding of rotation of the transfer member will cause the blades 28 to scoop the fluid from out of the chamber and also from out of the coupling through the orifices 18, from where it will pass through the central ring-shaped passage 41 into the transfer member in the fluid reservoir 8 from where it is thrown into the reservoir.

When the driving shaft 2 is rotating and the driven shaft 12 stationary, the fluid reservoir 8 will be rotating with the shaft 2 and the fluid therein will be in the form of a centrifugal fluid ring, under the influence of which the transfer member in the reservoir 8 will rotate. When it is desired to establish a driving connection between the driving shaft 2 and the driven shaft 12, the brake 35 is applied to retard or stop rotation of the transfer member. As soon as this action occurs, the blades 34 will scoop fluid from the reservoir and pass it through the passage 41 into the transfer member in the fluid chamber 23 from where it will be thrown to the periphery of such rotating chamber and pass through the orifices 18 into the coupling, whereby a driving connection is established.

By the provision of the fins 39 and 40, the fluid in passing from the central portions of the transfer members to their peripheral portions is instantaneously directed by such fins to the peripheral portions of the chamber and the reservoir.

It will be further appreciated that in forming the walls 17 and 24 of the fluid chamber 23 to follow the curvature of the runner housing 16, that upon filling the coupling, the fluid will be swept outwardly around the curve and directed into the orifices 18 communicating with the coupling, whereby an instantaneous fluid injection is obtained.

While I have illustrated certain preferred constructional details of my coupling, it is to be understood that I do not necessarily confine myself to such constructions and that I may make any such changes and alterations as may be desirable from time to time without departing from the spirit of my invention as set forth in the appended claims.

What I claim as my invention is:

1. A fluid coupling comprising a driving shaft, a driving rotatable impeller housing connected to the driving shaft and having a plurality of radial impeller vanes therein, a driven shaft, a runner housing connected to the driven shaft and contained within the impeller housing and having a plurality of radial runner vanes therein, a fluid containing chamber forming part of the impeller housing and rotating therewith and separated from the portion of the impeller housing containing the runner housing by a circular wall having a plurality of orifices in the vicinity of its periphery through which fluid enters and leaves the runner containing portion of the impeller housing, a fluid reservoir mounted to rotate with the chamber and the impeller housing, a pair of hubs, one hub being freely rotatable within the fluid containing chamber and the other hub being freely rotatable within the fluid reservoir, a pair of discs mounted upon one hub, a pair of discs mounted upon the other hub, a plurality of curved blades secured to and extending between the faces of the pair of discs on each hub and constituting fluid scoops oppositely directed to the direction of rotation of the fluid chamber and the fluid reservoir, a fluid passage contained within the hubs and extending from the inner ends of the scoop blades between one pair of discs to the inner ends of the scoop blades between the other pair of discs, brake means for independently controlling the rotation of each of the hubs, one disc in the fluid containing chamber being of less diameter than the other disc and from the periphery of which the blades protrude across the face of the large diameter disc, the large diameter disc being positioned remotely from the face of the wall separating the fluid containing chamber from the runner housing containing portion of the impeller housing, and a plurality of radially arranged fins carried upon said wall and having their outer side edges in close proximity to the side edges of the blades on the greater diameter disc.

2. A fluid coupling comprising a driving shaft, a driving rotatable impeller housing connected to the driving shaft and having a plurality of radial impeller vanes therein, a driven shaft, a runner housing connected to the driven shaft and contained within the impeller housing and having a plurality of radial runner vanes therein, a fluid containing chamber forming part of the impeller housing and rotating therewith and separated from the portion of the impeller housing containing the runner housing by a circular wall having a plurality of orifices in the vicinity of its periphery through which fluid enters and leaves the runner containing portion of the impeller housing, a fluid reservoir mounted to rotate with the chamber and the impeller housing, a pair of hubs, one hub being freely rotatable within the fluid containing chamber and the other hub being freely rotatable within the fluid reservoir, a pair of discs mounted upon one hub, a pair of discs mounted upon the other hub, a plurality of curved blades secured to and extending between the faces of the pair of discs on each hub and constituting fluid scoops oppositely directed to the direction of rotation of the fluid chamber and the fluid reservoir, a fluid passage contained within the hubs and extending from the inner ends of the scoop blades between one pair of discs to the inner ends of the scoop blades between the other pair of discs, brake means for independently controlling the rotation of each of the hubs, one disc in the fluid reservoir being of less diameter than the other disc and from the periphery of which the blades protrude across the face of the large diameter disc, and wherein the inner face of one of the end walls of the fluid reservoir carries a plurality of radially arranged fins having their outer side edges in close proximity to the sides edges of the blades on the greater diameter disc.

3. A fluid coupling comprising a driving shaft, a driving rotatable impeller housing connected to the driving shaft and having a plurality of radial impeller vanes therein, a driven shaft, a runner housing connected to the driven shaft and contained within the impeller housing and having a plurality of radial runner vanes therein, a fluid containing chamber forming part of the impeller housing and rotating therewith and separated from the portion of the impeller housing containing the runner housing by a circular wall having a plurality of orifices in the vicinity of its periphery through which fluid enters and leaves the runner containing portion of the impeller housing, a fluid reservoir mounted to rotate with the chamber and the impeller housing, a pair of hubs, one hub being freely rotatable within the fluid containing chamber and the other hub being freely rotatable within the fluid reservoir, a pair of discs mounted upon one hub, a pair of discs mounted upon the other hub, a plurality of curved blades secured to and extending between the faces of the pair of discs on each hub and constituting fluid scoops oppositely directed to the direction of rotation of the fluid chamber and the fluid reservoir, a fluid passage contained within the hubs and extending from the inner ends of the scoop blades between one pair of discs to the inner ends of the scoop blades between the other pair of discs, brake means for independently controlling the rotation of each of the hubs, one disc in the fluid containing chamber being of less diameter than the other disc and from the periphery of which the blades protrude across the face of the large diameter disc, the large diameter disc being positioned remotely from the face of the wall separating the fluid containing chamber from the runner housing containing portion of the impeller housing, a plurality of radially arranged fins carried upon said wall and having their outer side edges in close proximity to the side edges of the blades on the greater diameter disc, and wherein one disc in the fluid reservoir is of less diameter than the other disc and from the periphery of which the blades protrude across the face of the large diameter disc, the inner face of one of the end walls of the fluid reservoir carrying a plurality of radially arranged fins having their outer side edges in close proximity to the side edges of the blades on the greater diameter disc.

4. A fluid coupling comprising a driving shaft, a driving rotatable impeller housing of orbicular form and of 8-shaped cross-section connected to the driving shaft and having a plurality of radial impeller vanes therein, a driven shaft, a runner housing of concave ring form connected to the driven shaft and contained within the impeller housing and having a plurality of radial runner vanes therein, a fluid containing chamber forming part of the impeller housing and rotating therewith and separated from the runner housing containing portion of the impeller housing by a wall of convex ring form which is of a contour similar to that of the runner housing, said wall having a plurality of orifices in the vicinity of its periphery and through which fluid enters and leaves the runner containing portion of the impeller housing, a fluid reservoir mounted to rotate with the fluid containing chamber and the impeller housing, a pair of hubs, one hub being freely rotatable within the fluid containing chamber and the other hub being freely rotatable within the fluid reservoir, a pair of discs mounted upon the hub in the fluid containing chamber and being of concave ring form to conform with the shape of the wall separating the runner containing portion of the impeller housing from the fluid containing chamber, a pair of discs mounted upon the hub in the fluid reservoir, a plurality of curved spaced-apart blades secured to and extending between the faces of each pair of discs and extending from their central portions to their peripheral portions, said blades constituting fluid scoops and oppositely directed to the direction of rotation of the fluid chamber and the fluid reservoir, a fluid passage contained within the hubs and extending from the inner ends of the scoop blades between one pair of discs to the inner ends of the scoop blades between the other pair of discs, brake means for independently controlling the rotation of each of the hubs, a wall of dished form separating the fluid chamber from the fluid reservoir, one disc of the pair in the fluid reservoir being of less diameter than the other disc and from the periphery of which the blades protrude across the face of the large diameter disc which is of dished form to conform with the shape of said wall, the scoop blades on the large diameter disc having concave edges projecting towards said wall.

5. A fluid coupling comprising a driving shaft, a driving rotatable impeller housing of orbicular form and of 8-shaped cross-section connected to the driving shaft and having a plurality of radial impeller vanes therein, a driven shaft, a runner housing of concave ring form connected to the driven shaft and contained within the impeller housing and having a plurality of radial runner vanes therein, a fluid containing chamber forming part of the impeller housing and rotating therewith and separated from the runner housing containing portion of the impeller housing by a wall of convex ring form which is of a contour similar to that of the runner housing, said wall having a plurality of orifices in the vicinity of its periphery and through which fluid enters and leaves the runner containing portion of the impeller housing, a fluid reservoir mounted to rotate with the fluid containing chamber and the impeller housing, a pair of hubs, one hub being freely rotatable within the fluid containing chamber and the other hub being freely rotatable within the fluid reservoir, a pair of discs mounted upon the hub in the fluid containing chamber and being of concave ring form to conform with the shape of the wall separating the runner containing portion of the impeller housing from the fluid containing chamber, a pair of discs mounted upon the hub in the fluid reservoir, a plurality of curved spaced-apart blades secured to and extending between the faces of each pair of discs and extending from their central portions to their peripheral portions, said blades constituting fluid scoops and oppositely directed to the direction of rotation of the fluid chamber and the fluid reservoir, a fluid passage contained within the hubs and extending from the inner ends of the scoop blades between one pair of discs to the inner ends of the scoop blades between the other pair of discs, brake means for independently controlling the rotation of each of the hubs, a wall of dished form separating the fluid chamber from the fluid reservoir, one disc of the pair in the fluid reservoir being of less diameter than the other disc and from the periphery of which the blades protrude across the face of the larger diameter disc, the larger diameter disc being of dished form to conform with the shape of said wall, the scoop blades protruding across the face of the large diameter disc and having concave outer edges projecting towards said wall, and a plurality of radially arranged convex fins on said wall and having their outside convex edges in close proximity to the concave side edges of the blades on said larger diameter disc.

6. A fluid coupling comprising a driving shaft, a driving rotatable impeller housing of orbicular form and of 8-shaped cross-section connected to the driving shaft and having a plurality of radial impeller vanes therein, a driven shaft, a runner housing of concave ring form connected to the driven shaft and contained within the impeller housing and having a plurality of radial runner vanes therein, a fluid containing chamber forming part of the impeller housing and rotating therewith and separated from the runner housing containing portion of the impeller housing by a wall of convex ring form which is of a contour similar to that of the runner housing, said wall having a plurality of orifices in the vicinity of its periphery and through which fluid enters and leaves the runner containing portion of the impeller housing, a fluid reservoir mounted to rotate with the fluid containing chamber and the impeller housing, a pair of hubs, one hub being freely rotatable within the fluid containing chamber and the other hub being freely rotatable within the fluid reservoir, a pair of discs mounted upon the hub in the fluid containing chamber and being of concave ring form to conform with the shape of the wall separating the runner containing portion of the impeller housing from the fluid containing chamber, a pair of discs mounted upon the hub in the fluid reservoir, a plurality of curved spaced-apart blades secured to and extending between the faces of each pair of discs and extending from their central portions to their peripheral portions, said blades constituting fluid scoops and oppositely directed to the direction of rotation of the fluid chamber and the fluid reservoir, a fluid passage contained within the hubs and extending from the inner ends of the scoop blades between one pair of discs to the inner ends of the scoop blades between the other pair of discs, brake means for independently controlling the rotation of each of the hubs, one disc of the pair in the fluid containing chamber being of less diameter than the other disc and from the periphery of which the blades protrude across the face of the large diameter disc, the large diameter disc being positioned remotely from the face of the wall separating the fluid containing chamber from the runner housing containing portion of the impeller housing, the scoop blades protruding across the face of the large diameter disc and having concave outer edges projecting towards said fluid containing chamber wall, and a plurality of radially arranged convex fins on said fluid containing chamber wall and having their outside convex edges in close proximity to the concave side edges of the blades on said larger diameter disc in the fluid containing chamber.

7. A fluid coupling comprising a driving shaft, a driving rotatable impeller housing of orbicular form and of 8-shaped cross-section connected to the driving shaft and having a plurality of radial impeller vanes therein, a driven shaft, a runner housing of concave ring form connected to the driven shaft and contained within the impeller housing and having a plurality of radial runner vanes therein, a fluid containing chamber forming part of the impeller housing and rotating therewith and separated from the runner housing containing portion of the impeller housing by a wall of convex ring form which is of a contour similar to that of the runner housing, said wall having a plurality of orifices in the vicinity of its periphery and through which fluid enters and leaves the runner containing portion of the impeller housing, a fluid reservoir mounted to rotate with the fluid containing chamber and the impeller housing, a pair of hubs, one hub being freely rotatable within the fluid containing chamber and the other hub being freely rotatable within the fluid reservoir, a pair of discs mounted upon the hub in the fluid containing chamber and being of concave ring form to conform with the shape of the wall separating the runner containing portion of the impeller housing from the fluid containing chamber, a pair of discs mounted upon the hub in the fluid reservoir, a plurality of curved spaced-apart blades secured to and extending between the faces of each pair of discs and extending from their central portions to their peripheral portions, said blades constituting fluid scoops and oppositely directed to the direction of rotation of the fluid chamber and the fluid reservoir, a fluid passage contained within the hubs and extending from the inner ends of the scoop blades between one pair of discs to the inner ends of the scoop blades between the other pair of discs, brake means for independently controlling the rotation of each of the hubs, a wall of dished form separating the fluid chamber from the fluid reesrvoir, one disc of the pair in the fluid reservoir being of less diameter than the other disc and from the periphery of which the blades protrude across the face of the larger diameter disc, the larger diameter disc being of dished form to conform with the shape of said wall, the scoop blades protruding across the face of the large diameter disc and having concave outer edges projecting towards said wall, a plurality of radially arranged convex fins on said wall and having their outside convex edges in close proximity to the concave side edges of the blades on said larger diameter disc, and wherein one disc of the pair in the fluid containing chamber is of less diameter than the other disc and from the periphery of which the blades protrude across the face of the large diameter disc, the large diameter disc being positioned remotely from the face of the wall separating the fluid containing chamber from the runner housing containing portion of the impeller housing, the scoop blades protruding across the face of the large diameter disc and having concave outer edges projecting towards said fluid containing chamber wall, and a plurality of radially arranged convex fins on said fluid containing chamber wall and having their outside convex edges in close proximity to the concave side edges of the blades on said larger diameter disc in the fluid containing chamber.

JOHN EDWARD BECKER.

REFERENCES CITED

The following references are of record in the file of this patent:

UNITED STATES PATENTS

| Number | Name | Date |
|---|---|---|
| 1,859,607 | Sinclair | May 24, 1932 |
| 2,260,600 | Boeckeler | Oct. 28, 1941 |
| 2,295,024 | Boeckeler | Sept. 8, 1942 |
| 2,436,034 | Buehler | Feb. 17, 1948 |
| 2,568,706 | Becker | Sept. 25, 1951 |
| 2,582,952 | Becker | Jan. 22, 1952 |